(12) United States Patent
Letts et al.

(10) Patent No.: US 7,972,688 B2
(45) Date of Patent: Jul. 5, 2011

(54) HIGH DENSITY POLYURETHANE AND POLYISOCYANURATE CONSTRUCTION BOARDS AND COMPOSITE BOARDS

(76) Inventors: John B. Letts, Carmel, IN (US); Gregory A. Brandt, Carmel, IN (US)

( * ) Notice: Subject to any disclaimer, the term of this patent is extended or adjusted under 35 U.S.C. 154(b) by 989 days.

(21) Appl. No.: 11/343,466

(22) Filed: Jan. 30, 2006

(65) Prior Publication Data

US 2006/0179749 A1    Aug. 17, 2006

Related U.S. Application Data (60) Provisional application No. 60/649,385, filed on Feb. 1, 2005.

(51) Int. Cl.
*B32B 3/00* (2006.01)
(52) U.S. Cl. ............... 428/316.6; 428/319.3; 428/319.7; 52/309.1; 52/408; 52/783.1
(58) Field of Classification Search ............... 52/309.1, 52/408, 783.1, 746.11; 428/316.6, 319.3, 428/319.7
See application file for complete search history.

(56) References Cited

U.S. PATENT DOCUMENTS

| | | |
|---|---|---|
| 3,644,168 A | 2/1972 | Bonk et al. |
| 4,164,526 A | 8/1979 | Clay et al. |
| 4,426,488 A | 1/1984 | Wyman |
| 4,461,788 A | 7/1984 | Wyman |
| 4,603,078 A | 7/1986 | Zanker et al. |
| 4,680,214 A | 7/1987 | Frisch et al. |
| 4,829,097 A | 5/1989 | Tormala et al. |
| 5,055,339 A | 10/1991 | Eder et al. |
| 5,091,436 A | 2/1992 | Frisch |
| 5,182,309 A | 1/1993 | Hutzen |
| 5,362,342 A | 11/1994 | Murray et al. ............... 156/71 |
| 5,439,735 A | 8/1995 | Jamison |
| 5,686,499 A | 11/1997 | Fishback |
| 5,723,506 A | 3/1998 | Glorioso et al. |
| 5,735,092 A | 4/1998 | Clayton et al. |
| 5,784,845 A * | 7/1998 | Imeokparia et al. ............ 52/408 |
| 5,837,742 A | 11/1998 | Fishback |
| 5,846,461 A | 12/1998 | Collins et al. |
| 5,867,363 A | 2/1999 | Tsai et al. |
| 5,891,563 A | 4/1999 | Letts |
| 6,024,147 A | 2/2000 | Hunter, Jr. |
| RE36,674 E | 4/2000 | Gluck et al. |

(Continued)

FOREIGN PATENT DOCUMENTS

DE    44 28 304    2/1996

(Continued)

OTHER PUBLICATIONS

English Abstract of DE 44 28 304 A1.

*Primary Examiner* — Jeanette E Chapman
*Assistant Examiner* — James J Buckle, Jr.
(74) *Attorney, Agent, or Firm* — Sarah M. Jabbari; Arthur M. Reginelli (57) ABSTRACT

A covered low-slope or flat roof comprising (a) a roof deck, (b) an optional insulation board including a polyurethane or polyisocyanurate cellular structure having a density that is less than 2.5 pounds per cubic foot, (c) a coverboard including a polyurethane or polyisocyanurate cellular structure having a density greater than about 2.5 pounds per cubic foot, and (d) a membrane.

36 Claims, 4 Drawing Sheets

U.S. PATENT DOCUMENTS

| | | | |
|---|---|---|---|
| 6,044,604 A | 4/2000 | Clayton et al. | |
| 6,093,481 A * | 7/2000 | Lynn et al. | 428/217 |
| 6,117,375 A | 9/2000 | Garrett et al. | |
| 6,355,701 B1 | 3/2002 | Soukup et al. | |
| 6,372,811 B2 | 4/2002 | Singh et al. | |
| 6,395,796 B1 | 5/2002 | Ghobary et al. | |
| 6,774,071 B2 | 8/2004 | Horner, Jr. et al. | |
| 7,387,753 B2 | 6/2008 | Tackett et al. | |
| 7,718,253 B2 * | 5/2010 | Griffin et al. | 428/315.9 |
| 7,749,598 B2 * | 7/2010 | Agrawal | 428/305.5 |
| 2003/0082365 A1 | 5/2003 | Geary et al. | |
| 2003/0153656 A1 | 8/2003 | Sjerps | |
| 2003/0186045 A1* | 10/2003 | Wardle et al. | 428/316.6 |
| 2004/0087674 A1 | 5/2004 | Letts | |
| 2004/0102537 A1 | 5/2004 | Letts et al. | |
| 2004/0109983 A1 | 6/2004 | Rotter et al. | |
| 2005/0210789 A1 | 9/2005 | Anghel | 52/309.1 |
| 2006/0096205 A1 | 5/2006 | Griffin et al. | 52/309.4 |
| 2006/0127664 A1 | 6/2006 | Geary et al. | |
| 2006/0260237 A1 | 11/2006 | Griffin et al. | |
| 2007/0022711 A1 | 2/2007 | Paradis et al. | |

FOREIGN PATENT DOCUMENTS

| | | |
|---|---|---|
| DE | 298 00 150 | 4/1998 |
| DE | 202 10 576 | 2/2003 |
| WO | 98/15406 | 4/1998 |

* cited by examiner

HIGH DENSITY POLYURETHANE AND POLYISOCYANURATE CONSTRUCTION BOARDS AND COMPOSITE BOARDS

This application gains the benefit of U.S. Provisional Application No. 60/649,385, filed Feb. 1, 2005, which is incorporated herein by reference.

FIELD OF THE INVENTION

The present invention is directed toward high density polyurethane or polyisocyanurate construction boards and composite boards, as well as their use in flat or low-slope roofing systems.

BACKGROUND OF THE INVENTION

Flat or low-slope roofs are often covered with multi-layered roofing systems. These roofing systems often include a roof deck, an insulation layer, and a protective, weather-resistant membrane. In some situations, a coverboard is also employed. In many situations, insulation boards are typically adhered directly to a roof deck, which is most commonly constructed of concrete or steel. These insulation boards are typically closed-cell foams that include polyurethane or polyisocyanurate cellular materials with an insulating gas trapped within the cells. The insulation boards are then covered with the weather resistant membrane.

The foam insulation boards are typically low density cellular structures. The low density stems from two primary considerations. The first is cost because lower density cellular structures employ less material. Also, and often more important, the insulation value of the board can be improved with lower density structures. While a density of zero would be ideal (i.e., a vacuum), a certain degree of cellular structure—which gives rise to the density—is required to maintain the integrity of the insulation boards. Particularly, a foam core density of greater than about 1.5 pounds per cubic foot (pcf) is needed to maintain strength, and a core density of less than about 2 pcf is conventional for cost and insulation considerations.

Coverboards typically include fiber boards, gypsum products such as densdeck, and perlite boards. Coverboards are typically used to add integrity to the roof. For example, especially where improved fire performance is sought, the coverboard may first be applied to the steel deck, the insulation board is applied on top of the coverboard, and the membrane is then applied over the insulation board. Alternatively, especially where the roof may experience heavy traffic, the insulation board may be applied to the roof deck, the coverboard applied over the insulation board, and then the membrane is applied over the coverboard. In the latter situation, the coverboard obviously provides protection to the insulation board, which is prone to denting or damage due to the fact that the insulation boards are low density cellular materials.

Coverboards are also extensively used in re-roofing situations. In these applications, the coverboard may be referred to as a "re-coverboard." As with residential roofs, flat or low-slope roofs can be re-roofed without removing or "tearing off" the existing roofing membrane. In many instances, the re-coverboard is first applied to the existing roofing membrane before a new roofing membrane is applied to the roof. Also, an additional layer of insulation board can be applied before the new membrane is applied. Depending upon the result desired, the re-coverboard can be applied above or below the insulation board.

In other instances, a composite board is employed in lieu of (or possible in addition to) the coverboard and insulation board. The composite boards include an insulation layer together with a layer that is rather robust such as a wood fiber, gypsum, or perlite board. One advantage of the composite board is the ease of installation. In other words, rather than apply both an insulation board and a coverboard, the composite board can simply be installed in a one-step process. Other advantages have been observed based upon the fact that the composite board is formed integrally within a controlled environment (i.e., the factory).

The use of construction boards in new roofing systems and re-roof situations is, therefore, technologically important thereby necessitating further advancement in the field.

SUMMARY OF THE INVENTION

In general the present invention provides a covered low-slope or flat roof comprising (a) a roof deck, (b) an insulation board including a polyurethane or polyisocyanurate cellular structure having a density that is less than 2.5 pounds per cubic foot, (c) a coverboard including a polyurethane or polyisocyanurate cellular structure having a density greater than about 2.5 pounds per cubic foot, and (d) a membrane.

The present invention also includes a method of re-roofing a low-slope or flat roof, the method comprising (a) applying a re-coverboard to an existing covered low-slope or flat roof, wherein the re-coverboard includes a polyurethane or polyisocyanurate cellular structure having a density that is greater than about 2.5 pounds per cubic, and (b) applying a membrane to the re-coverboard subsequent to the step of applying a re-coverboard.

The present invention further includes a composite board comprising (I) a planar structure including (a) a first layer comprising a polyurethane or polyisocyanurate cellular structure having a density that is less than about 2.5 pounds per cubic foot, and (b) a second layer comprising a polyurethane or polyisocyanurate cellular structure having a density that is greater than about 2.5 pounds per cubic foot.

The present invention also includes a composite board comprising a least one low density layer comprising a polyurethane or polyisocyanurate cellular structure having a density that is less than about 2.5 pounds per cubic foot, and a least one high density layer comprising a polyurethane or polyisocyanurate cellular structure having a density that is greater than about 2.5 pounds per cubic foot.

DETAILED DESCRIPTION OF ILLUSTRATIVE EMBODIMENTS

One or more embodiments of the present invention are directed toward a high density polyurethane or polyisocyanurate cellular construction board. The unique high density characteristics of these boards allow them to be advantageously used in the construction of new flat or low-sloped roofs, as well as in re-roofing situations. In other words, these construction boards are useful as coverboards or re-coverboards.

Figure 1:
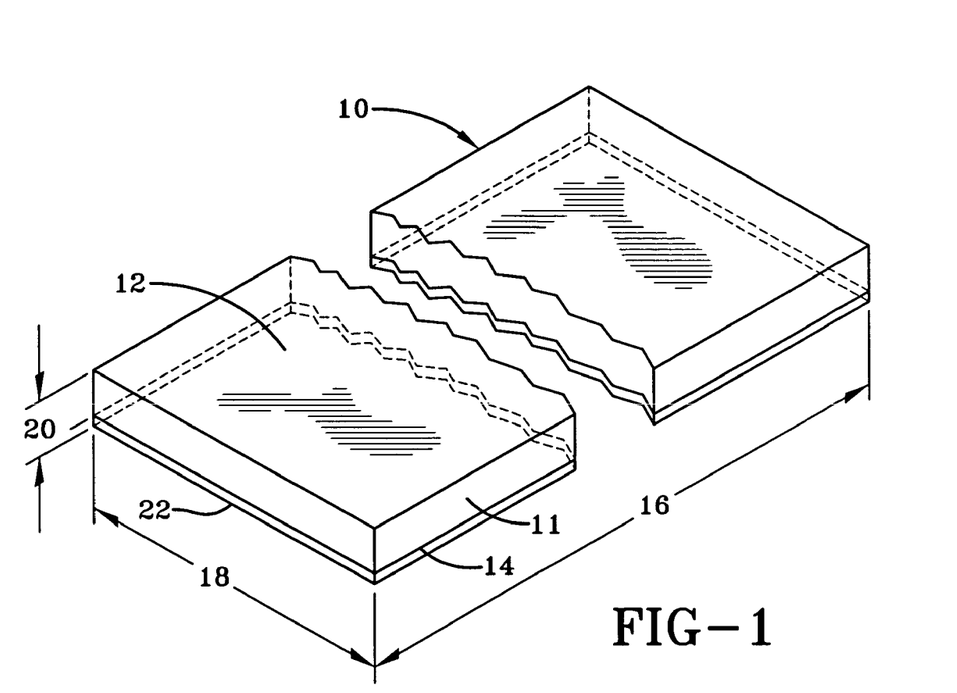
FIG. 1 is a fragmentary perspective view of a high-density construction board of the present invention.

A high density board according to one or more embodiments is depicted in FIG. 1. Board 10 includes a cellular body 11 having a planar shape with first planar surface 12 and second planar surface 14, each defined by a length 16 and a width 18. Board 10 may also be characterized by a thickness 20. Length 16 and width 18 of board 10 may vary, and these embodiments are not necessarily limited by the selection of a particular length or width. Nonetheless, because these boards are advantageously employed in the construction industry, board 10 may be sized to a 4'×8' sheet (e.g., 3.75'×7.75'), a 4'×10' sheet, or a 4'×4' sheet. The width 20 of the board can generally be greater than about 0.5 inches, and may be from about 0.5 to 4.5 inches or in other embodiments from about 1.0 to 4.0 inches in thickness.

Board 10 may include an optional facer 22, which can be positioned adjacent one of the first or second planar surfaces 12 or 14. For example, as shown in FIG. 1, facer 22 may be positioned adjacent second planer surface 14. In one or more embodiments, facer 22 can be integral with planar surface to which it is adjacent as a result of the methods employed to manufacture board 10, which will be disclosed below.

Facer 22 may include a variety of materials or compositions, many of which are known or conventional in the art. Useful facers include those comprising aluminum foil, cellulosic fibers, reinforced cellulosic fibers, craft paper, coated glass fiber mats, uncoated glass fiber mats, chopped glass, and combinations thereof. Useful facer materials are known as described in U.S. Pat. Nos. 6,774,071, 6,355,701, RE 36674, 6,044,604, and 5,891,563, which are incorporated herein by reference. The thickness of the facer material may vary; for example, it may be from about 0.01 to about 1.00 or in other embodiments from about 0.015 to about 0.050 inches thick. The facer materials can also include more robust or rigid materials such as fiber board, perlite board, or gypsum board. The thickness of the rigid facer can vary; for example, the thickness of the rigid facer can be from about 0.2 to about 1.5 inches, or in other embodiments from about 0.25 to about 1.0 inches.

Figure 1A:
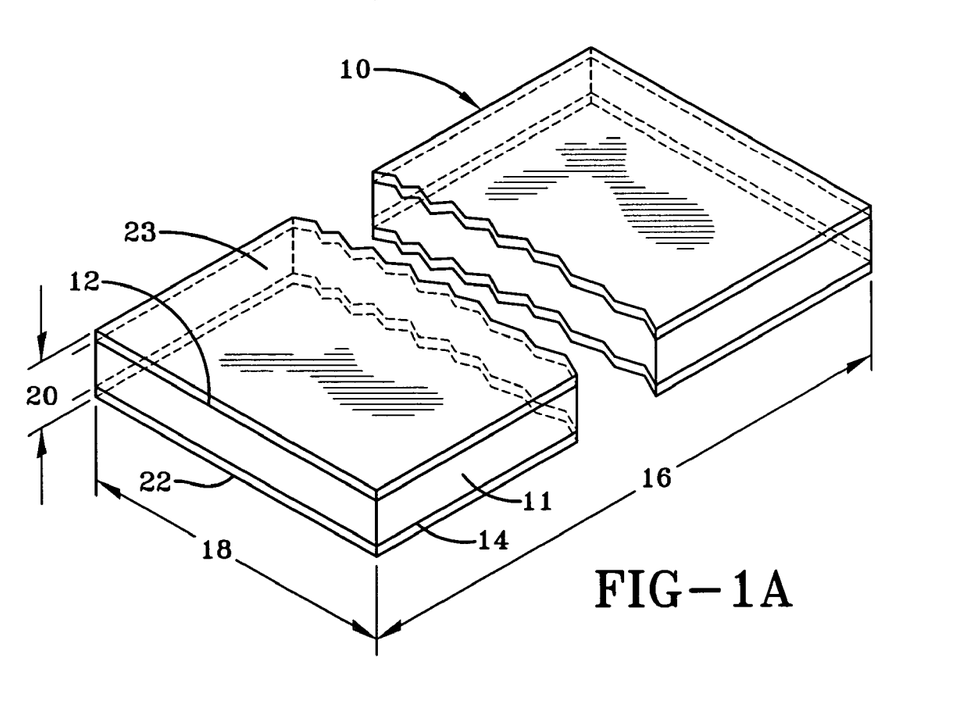
FIG. 1A is a fragmentary perspective view of another high-density construction board of the present invention.

As shown in FIG. 1A, board 10 may also optionally include a facer 23 positioned adjacent the planer surface opposite the planar surface on which facer 22 is positioned. For example, facer 22 is positioned adjacent second planer surface 14, and facer 23 is positioned adjacent first planer surface 12. Facer 23 can include the same or different materials or compositions, as well as the same or different thickness as facer 22.

Also, as noted above, facers 22 and 23 are optional. Therefore, in one or more embodiments, board 10 may be facerless. The ability to produce facerless construction boards is known as described in U.S. Pat. No. 6,117,375, which is incorporated herein by reference.

Body 11 includes a polyurethane or polyisocyanurate cellular structure, which refers to an interconnected network of solid struts or plates that form the edges and faces of cells. These cellular structures may, in one or more embodiments, also be defined by a "relative density" that is less than about 0.8, in other embodiments less than 0.5, and in other embodiments less than 0.3. As those skilled in the art will appreciate, "relative density" refers to the density of the cellular material divided by that of the solid from which the cell walls are made. As the relative density increases, the cell walls thicken and the pore space shrinks such that at some point there is a transition from a cellular structure to one that is better defied as a solid containing isolated pores.

Despite the cellular nature of body 11, it has a high density. In one or more embodiments, the density of body 11 is greater than 2.5 pounds per cubic foot, as determined according to ASTM C303, in other embodiments the density is greater than 2.8 pounds per cubic foot, in other embodiments greater than 3.0 pounds per cubic foot, and still in other embodiments greater than 3.5 pounds per cubic foot; on the other hand, in one or more embodiments, the density of body 11 may be less than 20 pounds per cubic foot, in other embodiments less than 10 pounds per cubic foot, and still in other embodiments less than 6 pounds per cubic foot.

The boards of one or more embodiments of this invention can be manufactured by using known techniques for producing polyurethane or polyisocyanurate insulation boards except the formulation may need to be modified, and the hydraulic clamping pressure of the laminator may need to be adjusted. Furthermore, the amount of total blowing agent (for example, carbon dioxide from the reaction of isocyanates with isocyanate reactive compounds such as water plus a physical blowing agent) may need to be decreased. Likewise, the amount of catalysts may also need to be decreased. The higher density and potentially higher foam expansion pressure may necessitate higher hydraulic clamping pressure to maintain uniform board thickness and to move the product down the laminator.

In general, processes for the manufacture of polyurethane or polyisocyanurate insulation boards are known in the art as described in U.S. Pat. Nos. 6,117,375, 6,044,604, 5,891,563, 5,573,092, U.S. Publication Nos. 2004/01099832003/0082365, 2003/0153656, 2003/0032351, and 2002/0013379, as well as U.S. Ser. Nos. 10/640,895, 10/925,654, and 10/632,343, which are incorporated herein by reference.

In general, and in a manner that is conventional in the art, the boards of the present invention may be produced by developing or forming a polyurethane and/or polyisocyanurate foam in the presence of a blowing agent. The foam may be prepared by contacting an A-side stream of reagents with a B-side stream of reagents and depositing the mixture or developing foam onto a laminator. As is conventional in the art, the A-side stream includes an isocyanate and the B-side includes an isocyanate-reactive compound.

The A-side stream typically only contains the isocyanate, but, in addition to isocyanate components, the A-side stream may contain flame-retardants, surfactants, blowing agents and other non-isocyanate-reactive components.

Suitable isocyanates are generally known in the art. Useful isocyanates include aromatic polyisocyanates such as diphenyl methane, diisocyanate in the form of its 2,4'-, 2,2'-, and 4,4'-isomers and mixtures thereof, the mixtures of diphenyl methane diisocyanates (MDI) and oligomers thereof known in the art as "crude" or polymeric MDI having an isocyanate functionality of greater than 2, toluene diisocyanate in the form of its 2,4' and 2,6'-isomers and mixtures thereof, 1,5-naphthalene diisocyanate, and 1,4' diisocyanatobenzene. Exemplary isocyanate components include polymeric Rubinate 1850 (Huntsmen Polyurethanes), polymeric Lupranate M70R (BASF), and polymeric Mondur 489N (Bayer).

The B-side stream, which contains isocyanate reactive compounds, may also include flame retardants, catalysts, emulsifiers/solubilizers, surfactants, blowing agents, fillers, fungicides, anti-static substances, water and other ingredients that are conventional in the art.

An exemplary isocyanate-reactive component is a polyol. The terms polyol or polyol component include diols, polyols, and glycols, which may contain water as generally known in the art. Primary and secondary amines are suitable, as are polyether polyols and polyester polyols. Useful polyester polyols include phthalic anhydride based PS-2352 (Stepen), phthalic anhydride based polyol PS-2412 (Stepen), teraphthalic based polyol 3522 (Kosa), and a blended polyol TR 564 (Oxid). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one embodiment a polyester polyol is employed. In one or more embodiments, the present invention may be practiced in the appreciable absence of any polyether polyol. In certain embodiments, the ingredients are devoid of polyether polyols.

Catalysts are believed to initiate the polymerization reaction between the isocyanate and the polyol, as well as a trimerization reaction between free isocyanate groups when polyisocyanurate foam is desired. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris[(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, emulsifiers, and/or solubilizers may also be employed in the production of polyurethane and polyisocyanurate foams in order to increase the compatibility of the blowing agents with the isocyanate and polyol components.

Surfactants may serve two purposes. First, they may help to emulsify/solubilize all the components so that they react completely. Second, they may promote cell nucleation and cell stabilization. Exemplary surfactants include silicone copolymers or organic polymers bonded to a silicone polymer. Although surfactants can serve both functions, a more cost effective method to ensure emulsification/solubilization may be to use enough emulsifiers/solubilizers to maintain emulsification/solubilization and a minimal amount of the surfactant to obtain good cell nucleation and cell stabilization. Examples of surfactants include Pelron surfactant 9920, Goldschmidt surfactant B8522, and GE 6912. U.S. Pat. Nos. 5,686,499 and 5,837,742 are incorporated herein by reference to show various useful surfactants.

Suitable emulsifiers/solubilizers include DABCO Kitane 20AS (Air Products), and Tergitol NP-9 (nonylphenol+9 moles ethylene oxide).

Flame Retardants may be used in the production of polyurethane and polyisocyanurate foams, especially when the foams contain flammable blowing agents such as pentane isomers. Useful flame retardants include tri(monochloropropyl)phosphate, tri-2-chloroethyl phosphate, phosphonic acid, methyl ester, dimethyl ester, and diethyl ester. U.S. Pat. No. 5,182,309 is incorporated herein by reference to show useful blowing agents.

Useful blowing agents include isopentane, n-pentane, cyclopentane, alkanes, (cyclo)alkanes, hydrofluorocarbons, hydrochlorofluorocarbons, fluorocarbons, fluorinated ethers, alkenes, alkynes, carbon dioxide, and noble gases. Depending on the required density of the board, the amount of blowing agent may need to be decreased up to about 95% from a standard formulation. The amount of water may also, optimally, be reduced. The less blowing agent used, the less catalyst is generally used.

As noted above, the high density polyurethane or polyisocyanurate boards of this invention may be employed in the construction of new roofing structures and thereby form a unique flat or low-slope roofing system. For example, FIGS. 2 and 3, respectively, show unique roofing systems 30 and 31 that employ high density board 10. Furthermore, although the high density board 10 depicted in FIGS. 2 and 3 does not include facers, facers can be used.

Figure 2:
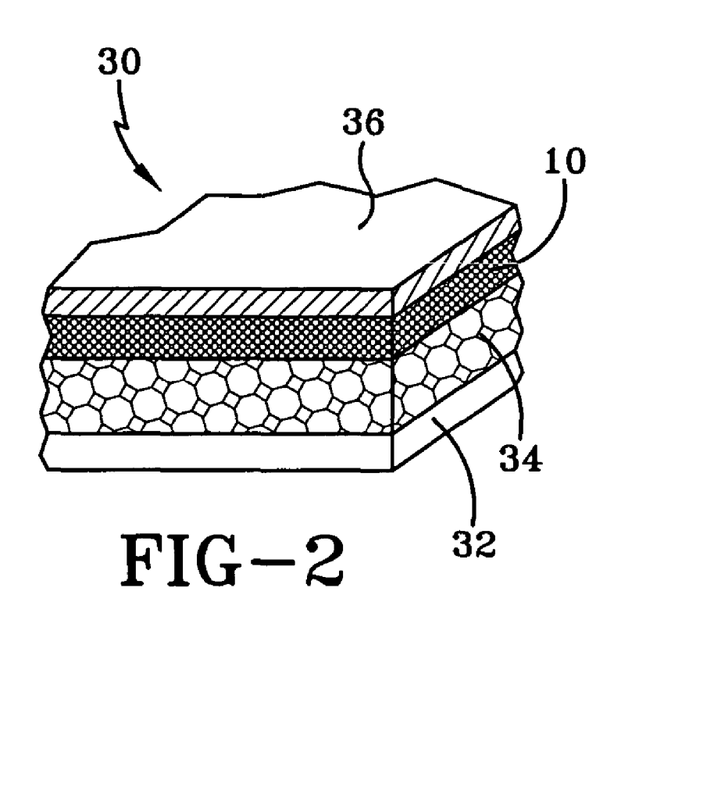
FIG. 2 is a fragmentary perspective view of a roofing system including a high density coverboard.
Figure 3:
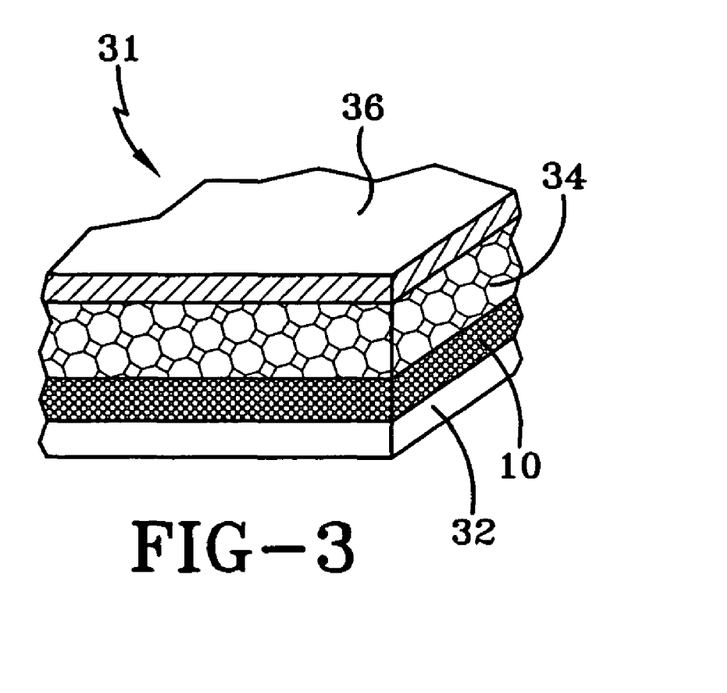
FIG. 3 is a fragmentary perspective view of a roofing system including a high density coverboard.

As shown in FIG. 2, roofing system 30 includes a roof deck 32 having insulation board 34 disposed thereon, high density board 10 positioned on optional insulation board 34, and a water-protective layer or membrane 36 disposed on top of high density board 10. In an alternate embodiment, as shown in FIG. 3, roofing system 31 includes roof deck 32 with high density board 10 disposed thereon. Insulation board 34 is positioned on high density board 10, and water protective layer or membrane 36 is disposed on top of optional insulation board 34.

The particular embodiment shown in FIG. 2 is advantageous on roofs that experience high traffic and/or heavy loads. High density board 10 can be fairly robust and durable, and therefore protects insulation board 34 from damage. As those skilled in the art will appreciate, the low-density nature of insulation board 34 makes it susceptible to damage, particularly through denting, when it is mechanically impinged such as by pedestrian or vehicle traffic, or by objects falling and contacting the roof. Also, the embodiment shown in FIG. 2 may advantageously reduce flame propagation in exterior fire tests such as UL 790 or ASTM E108.

Practice of this invention is not limited by the selection of any particular roof deck. Accordingly, the roofing systems of this embodiment, as shown in FIGS. 2 and 3, can include a variety of roof decks. Exemplary roof decks include concrete pads, steel decks, wood beams, and foamed concrete decks.

Practice of this invention is likewise not limited by the selection of any particular insulation board. As is known in the art, several insulation materials can be employed. In one embodiment, the insulation board comprises polyurethane or polyisocyanurate cellular material. These insulation boards are known in the art as disclosed in U.S. Pat. Nos. 6,117,375, 6,044,604, 5,891,563, 5,573,092, U.S. Publication Nos. 2004/01099832003/0082365, 2003/0153656, 2003/0032351, and 2002/0013379, as well as U.S. Ser. Nos. 10/640,895, 10/925,654, and 10/632,343, which are incorporated herein by reference. In general, polyurethane is characterized by having an index of from about 100 to about 120; polyisocyanurate is generally characterized by having an index that is in excess of 150 (in other embodiments at least 175, and in other embodiments at least 200; and insulation with an index between 120 and 150 generally includes a mix of polyurethane and polyisocyanurate.

In those embodiments where the insulation layer comprises polyurethane or polyisocyanurate cellular material, these cellular materials are defined by a foam density (ASTM C303) that is less than 2.5 pounds per cubic foot, in other embodiments less than 2.0 pounds per cubic foot, in other embodiments less than 1.9 pounds per cubic foot, and still in other embodiments less than 1.8 pounds per cubic foot. In one or more embodiments, these polyurethane or polyisocyanurate insulation layers are likewise characterized by having a density that is greater than 1.50 pounds per cubic foot and optionally greater than 1.55 pounds per cubic foot.

Practice of this invention is likewise not limited by the selection of any water-protective layer or membrane. As is known in the art, several membranes can be employed to protect the roofing system from environmental exposure, particularly environmental moisture in the form of rain or snow. Useful protective membranes include polymeric membranes. Useful polymeric membranes include both thermoplastic and thermoset materials. For example, and as is known in the art, membrane prepared from poly(ethylene-co-propylene-co-diene) terpolymer rubber or poly(ethylene-co-propylene) copolymer rubber can be used. Roofing membranes made from these materials are well known in the art as described in U.S. Pat. Nos. 6,632,509, 6,615,892, 5,700,538, 5703,154, 5,804,661, 5,854,327, 5,093,206, and 5,468,550, which are incorporated herein by reference. Other useful polymeric membranes include those made from various thermoplastic polymers or polymer composites. For example, thermoplastic olefin (i.e., TPO), thermoplastic vulcanizate (i.e., TPV), or polyvinylchloride (PVC) materials can be used. The use of these materials for roofing membranes is known in the art as described in U.S. Pat. Nos. 6,502,360, 6,743,864, 6,543,199, 5,725,711, 5,516,829, 5,512,118, and 5,486,249, which are incorporated herein by reference. In one or more embodiments, the membranes include those defined by ASTM D4637-03 and/or ASTM D6878-03.

Still in other embodiments, the protective membrane can include bituminous or asphalt membranes. In one embodiment, these asphalt membranes derive from asphalt sheeting that is applied to the roof. These asphalt roofing membranes are known in the art as described in U.S. Pat. Nos. 6,579,921, 6,110,846, and 6,764,733, which are incorporated herein by reference. In other embodiments, the protective membrane can derive from the application of hot asphalt to the roof.

Other layers or elements of the roofing systems are not excluded by the practice of this invention. For example, and as is known in the art, another layer of material can be applied on top of the protective membrane. Often these materials are applied to protect the protective membranes from exposure to electromagnetic radiation, particularly that radiation in the form of UV light. In certain instances, ballast material is applied over the protective membrane. In many instances, this ballast material simply includes aggregate in the form of rock, stone, or gravel; U.S. Pat. No. 6,487,830, is incorporated herein in this regard.

The high density boards are also advantageously useful in re-roof situations. In other words, and as is known in the art, an existing roof can be re-roofed without the need to remove one or more of the existing layers of the existing roof system. Indeed, a secondary roofing system can be applied directly over the existing roofing system. In these instances, it is advantageous to apply a "re-coverboard" over the existing roof before application of another protective membrane. In certain instances, a second layer of insulation (i.e., a recover insulation layer) may also be applied. The additional layer of insulation can be applied above or below the re-coverboard, and therefore the protective membrane is either applied to the re-coverboard or the recover insulation layer. The high-density boards of this invention are advantageously applied in re-roofing situations as a recovery board.

Figure 4:
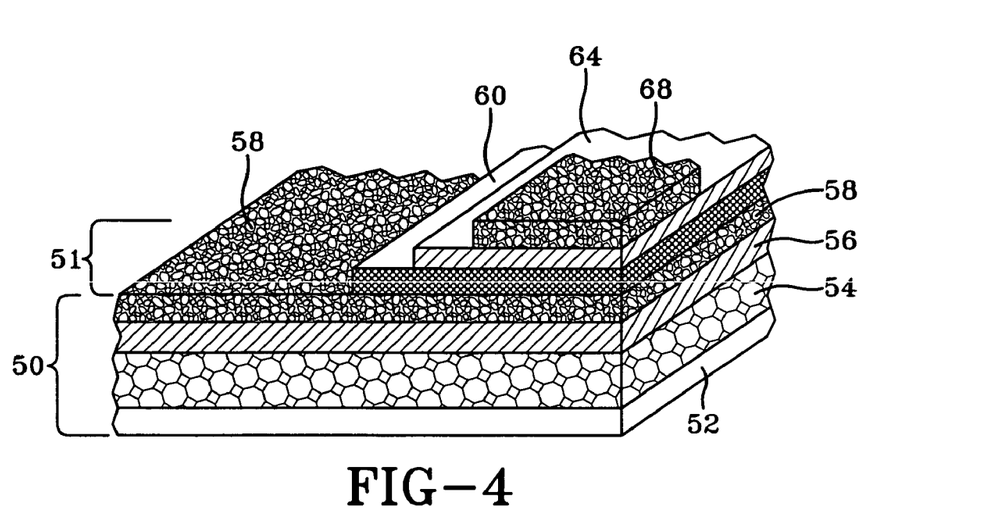
FIG. 4 is a fragmentary perspective view of a roofing system including re-roof layers.

For example, one embodiment is shown in FIG. 4, which includes an original roofing system 50 and a re-roof system 51. In a manner consistent with that described above, existing roof 50 includes roof deck 52, insulation layer 54, protective membrane 56, and ballast material 58. Disposed on existing roof 50 is re-roof system 51, which includes high density re-coverboard 60, recover protective membrane 64, and ballast material 68. As noted above, high density re-coverboard 60 is consistent with the high density boards described hereinabove with respect to the new roof construction. The nature of this high density board advantageously allows it to be used as a re-coverboard. That is, re-coverboard 60 can be applied directly to an existing roof. The robust nature of re-coverboard 60 advantageously allows it to be applied directly to material such as ballast material 58.

Figure 5:
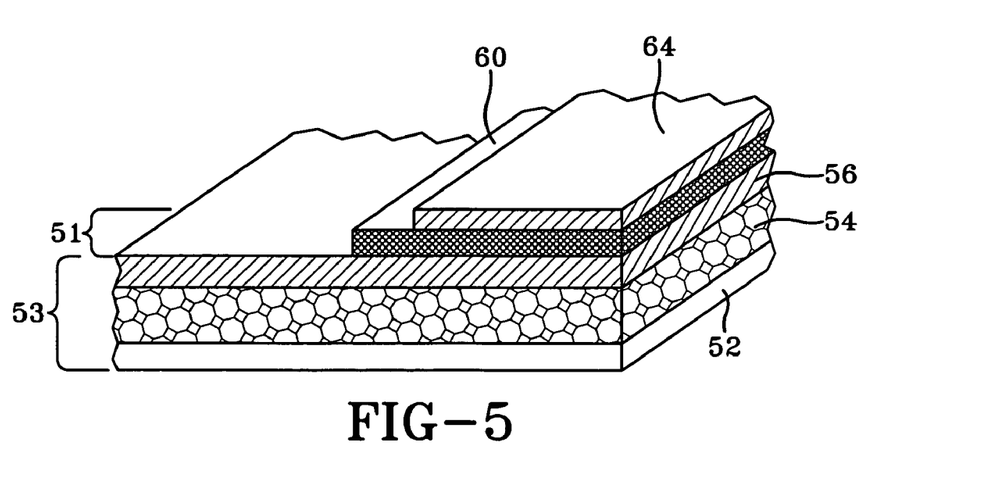
FIG. 5 is a fragmentary perspective view of a roofing system including re-roof layers.

In other embodiments, the re-coverboard 60 of this embodiment can be applied directly to an existing roofing membrane. For example, and as shown in FIG. 5, re-coverboard 60 and protective membrane 64 can form a re-roof system 51 on top of an existing roofing system 53, which includes existing roof deck 52, existing insulation layer 54, and existing protective membrane 56.

In another embodiment, a composite construction board is provided. In one embodiment, this composite board can advantageously be employed in the manufacture of new construction roofing systems. In other embodiments, the composite boards can advantageously be employed in re-roof situations. In general, the composite boards include one or more high density layers and one or more low density layers. They may also optionally include one or more facers or one or more reinforcing layers such as reinforcing scrims. The positioning of the various layers and facers can advantageously be varied based upon the intended use or properties that are desired.

Figure 6:
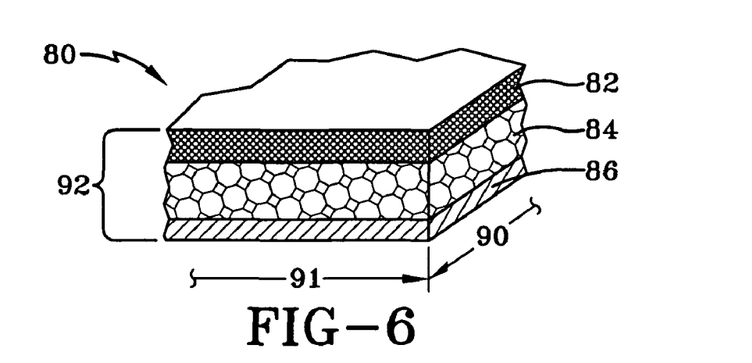
FIG. 6 is a fragmentary perspective view of a composite construction board of the present invention.
Figure 6A:
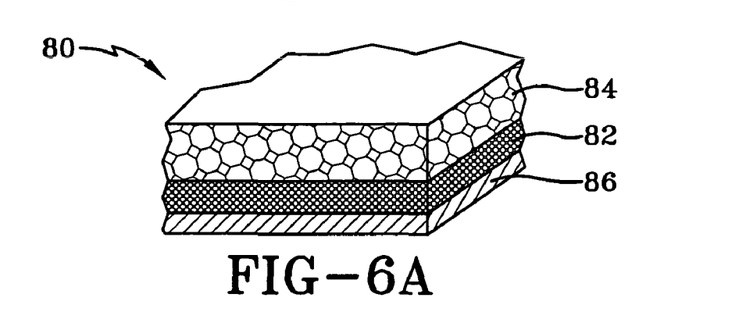
FIG. 6A is a fragmentary perspective view of another composite construction board of the present invention.

One embodiment of the composite construction board is shown in FIG. 6. A composite board 80 includes high density layer 82, low density layer 84 positioned underneath high density layer 82, and an optional facer 86. The positions of high density layer 82 and low density layer 84 may optionally be reversed. That is, rather than the configuration of composite board 80 shown in FIG. 6, low density layer 84, as shown in FIG. 6A, can instead be positioned above high density layer 82.

Figure 6B:
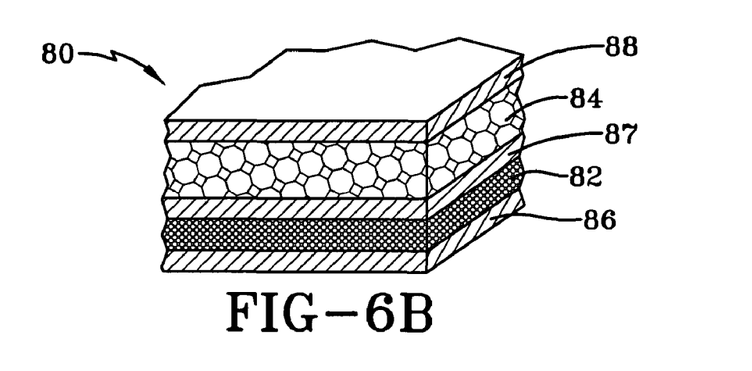
FIG. 6B is a fragmentary perspective view of still another composite construction board of the present invention.
Figure 6C:
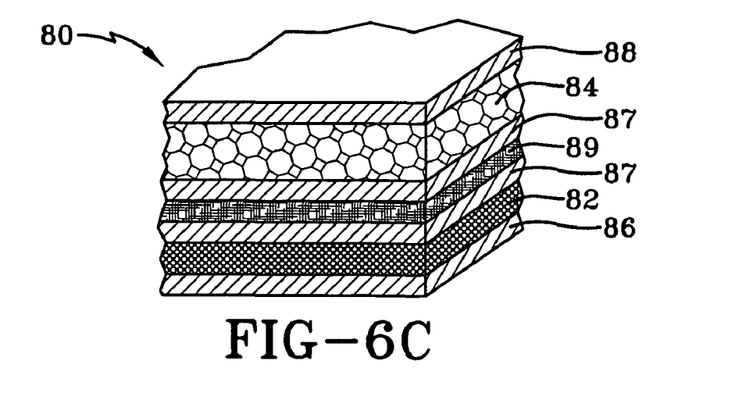
FIG. 6C is a fragmentary perspective view of still yet another composite construction board of the present invention.

Furthermore, additional facers may optionally be positioned between high density layer 82 and low density layer 84 and/or optionally be positioned on the side of composite board 80 opposite optional facer 86. For example, as shown in FIG. 6B, composite board 80 includes an optional facer 87 positioned between high density layer 82 and low density layer 84, and another optional facer 88 positioned on the side of composite board 80 opposite optional facer 86. Furthermore, composite board 80 can also be configured to include an optional reinforcing layer positioned between two or more of the various layers. For example, as shown in FIG. 6C, a fiberglass mat 89 is positioned between two optional facers 87, 87' which are positioned between high density layer 82 and low density layer 84.

Additionally, composite board 80 can be constructed of a plurality of alternating high density layers and low density layers. For example, composite board 80 may include four layers, where each layer alternates between high density and low density layers. Furthermore, composite board 80 could be constructed of three alternating layers where a high density layer is sandwiched between two low density layers, or where a low density layer is sandwiched between two high density layers. Either way, like the other embodiments discussed above, composite board 80 includes at least one high density layer 82 and at least one low density layer 84. Moreover, these layers can interface with one another, or facers can be provided therebetween.

As with the high density construction boards of the first embodiment, high density layer 82 of composite board 80 may be characterized by having a density that is greater than 2.5 pounds per cubic foot, in other embodiments greater than 3.0 pounds per cubic foot, and still in other embodiments greater than 3.5 pounds per cubic foot; on the other hand, the density of high density layer 82 may be less than 20 pounds per cubic foot, in other embodiments less than 10 pounds per cubic foot, and still in other embodiments less than 6 pounds per cubic foot. Low density layer 84 can be characterized by having a foam density that is less than 2.5 pounds per cubic foot, in other embodiments less than 2.0 pounds per cubic foot, in other embodiments less than 1.9 pounds per cubic foot, and still in other embodiments less than 1.8 pounds per cubic foot. In one or more embodiments, these polyurethane or polyisocyanurate insulation layers may likewise be characterized by having a density that is greater than 1.50 pounds per cubic foot and optionally greater than 1.55 pounds per cubic foot.

In one or more embodiments, high density layer 82 and low density layer 84 are cellular in nature. In other words, these layers are characterized by an interconnected network of solid struts or plates that form the edges and faces of cells. In one or more embodiments, the cellular material comprises polyisocyanurate or polyurethane.

When present, the optional facers (e.g., 86, 87, 88) can be formed from a variety of materials. Exemplary facer materials include aluminum foil, cellulosic fibers, reinforced cellulosic fibers, craft paper, coated glass fiber mats, uncoated glass fiber mats, chopped glass, and combinations thereof. Useful facer materials are known as described in U.S. Pat. Nos. 6,774,071, 6,355,701, RE 36674, 6,044,604, and 5,891,563, which are incorporated herein by reference. The thickness of the facer material may vary; for example, it may be from about 0.010 to about 0.100 or in other embodiments from about 0.015 to about 0.050 inches thick. The facer materials can also include more robust or rigid materials such as fiber board, perlite board, or gypsum board. The thickness of the rigid facer can vary; for example, the thickness of the rigid facer can be from about 0.20 to about 1.50 inches, or in other embodiments from about 0.25 to about 1.00 inches. When present, the optional reinforcing layers can include a variety of materials. In one or more embodiments, fiber scrims or mats can be employed. These mats and scrims may include woven and non-woven constructions. The fibers may include fiberglass or synthetic materials such as polyethylene or nylon.

In one or more embodiments, high density layer 82 and low density layer 84 comprise the same or similar material. As a result, there is little interfacial tension between the layers, which provides an advantageous strength. In one or more embodiments, high density layer 82 and low density layer 84 are integral with one another as a result of the manufacture and process. In other words, the composite board 80 can be manufactured by forming low-density layer 84 on top of high density layer 82, and the optional facer 86 can thereafter be selectively applied to low density layer 84 (FIG. 6) and/or high density layer 82 (FIG. 6A).

In one or more embodiments, high density layer 82 and low density layer 84 can be prepared by employing techniques known in the art for the production of cellular polyurethane or polyisocyanurate construction boards. As noted above, the methods are known in the art as disclosed in U.S. Pat. Nos. 6,117,375, 6,044,604, 5,891,563, 5,573,092, U.S. Publication Nos. 2004/01099832003/0082365, 2003/0153656, 2003/0032351, and 2002/0013379, as well as U.S. Ser. Nos. 10/640,895, 10/925,654, and 10/632,343 which are incorporated herein by reference.

In one embodiment, the high density cellular body is first formed using techniques described above. In one particular embodiment, a facer is positioned above and below the high density layer. Following the manufacture of this high density board, a low density layer is formed thereon (i.e., the low density layer is formed on one of the facers positioned on the high density layer) using techniques known in the art. In one particular embodiment, a facer can then be positioned on top of the low density layer (i.e., on the planar surface of the low density layer that is opposite to the high density layer). In one or more embodiments, this manufacturing technique can occur within a continuous operation or production line.

In other embodiments, a high density cellular body or layer can be formed with optional facers. In a second manufacturing step, a low density layer or cellular body can be formed with optional facers. The high density layer (with optional facers) and low density layer (with optional facers) can be adhered together to form the composite structure. Optionally, a reinforcement can be positioned therebetween. Conventional adhesives may be employed to adhere the boards to one another. In one or more embodiments, the adhesive may include a one-part or two-part polyurethane or polyisocyanurate adhesive. In other embodiments, a hot-melt adhesive may be employed. Exemplary hot-melt adhesives include polyolefin and polydiolefin-based hot-melt adhesives.

The composite boards can be sized to a variety of dimensions. In general, composite boards 80 are planar in nature and, as shown in FIG. 6, can be characterized by including a length 90, a width 91, and a height or thickness 92. Because the composite boards are advantageously employed in the construction industry, they may advantageously be sized to a four foot width and eight foot length (i.e., 4'×8'), other useful sizes may include 4'×10 and 4'×4'. As for the overall thickness of the composite board, the respective thicknesses of the high-density layers and low-density layers can vary and therefore the overall thickness can vary. Likewise, the thickness of the facer employed, if any, will likewise contribute to the overall thickness of the composite board. In any event, the thickness of the composite boards of one or more embodiments can advantageously be from about 1.0 to about 6.0 inches, or in other embodiments from about 1.5 to about 5.0 inches, or in other embodiments from about 2.0 to about 4.5 inches. In certain embodiments, the thickness of the high-density layer can vary from about 0.5 to about 2.0 inches, in other embodiments from about 0.5 to 1.0 inches, and still in other embodiments from about 0.50 to about 0.75 inches. The low-density layer, in one or more embodiments, can also vary from about 0.5 to about 4.0 inches, and in other embodiments from about 1.0 to about 4.0 inches, and still in other embodiments from about 2.0 to about 4.0 inches.

In order to demonstrate the practice of the present invention, the following examples have been prepared and tested. The examples should not, however, be viewed as limiting the scope of the invention. The claims will serve to define the invention.

EXAMPLES

Experiment 1

A 4'×8'×0.75" high-density cellular body was manufactured with cellulosic facers on the upper and lower surfaces to form a high-density construction board in accordance with this invention. The cellular body was characterized by a foam density of 7.5 pounds per cubic foot. The compressive strength of the board (per ASTM 1620) was 42.1 pounds per square inch.

Experiment 2

A 4'×8'×0.75" high density cellular body was manufactured with cellulosic facers on the upper and lower surfaces to form a high density construction board in accordance with this invention. The cellular body was characterized by a foam density of 12 pounds per cubic foot. This board was tested according to UL 790 for fire spread. Specifically, the board was mechanically attached to a 60 mil low slope, flame retardant EPDM membrane and positioned on top of a 3" standard low-density board. Pursuant to this test, the fire spread was a maximum of 3'11" with a lateral spread no closer than 6 inches from the edges at a 0.5:12 slope. As those skilled in the art will appreciate, a pass requires less than 6' flame spread, and the front and lateral flame spread is permitted only along one edge.

Experiment 3

Using a similar board to that employed in Experiment 2, the UL 790 test was performed with a 45 mil standard EPDM membrane in lieu of the 60 mil membrane. The flame spread was 4'6" of frontal flame spread with no lateral flame spread closer than 4" from the edges.

Experiment 4

A high density board similar to that in Experiment 2 was analyzed for uplift performance. The board was mechanically attached to a 45 mil standard EPDM membrane using 16 fasteners and plates per 4'×8' board. Failure occurred at 41 seconds into 165 pounds per square foot. When the fastener pattern was reduced to 10 fasteners end plates per 4'×8' board, failure occurred at 34 seconds into 105 pounds per square foot.

Various modifications and alterations that do not depart from the scope and spirit of this invention will become apparent to those skilled in the art. This invention is not to be duly limited to the illustrative embodiments set forth herein.

What is claimed is:

1. A covered low-slope or flat roof comprising:
   (a) a roof deck;
   (b) an insulation board including a polyurethane, a polyisocyanurate, or a mix of polyurethane and polyisocyanurate cellular structure, said insulation board having a density that is less than 2.5 pounds per cubic foot, and said insulation board having a first planar surface and a second planar surface, said first planar surface and said second planar surface each having a facer positioned adjacent thereto;
   (c) a coverboard including a polyurethane, a polyisocyanurate, or a mix of polyurethane and polyisocyanurate cellular structure, said coverboard having a density greater than about 2.5 pounds per cubic foot and less than 6 pounds per cubic foot, an iso index of at least 175, and a first planar surface and a second planar surface, said first planar surface and said second planar surface each having a glass facer positioned adjacent thereto; and
   (d) a polymeric membrane, wherein said insulation board and said coverboard are between said roof deck and said polymeric membrane.

2. A covered low-slope or flat roof according to claim 1, wherein said density of said coverboard is greater than about 3 pounds per cubic foot.

3. A covered low-slope or flat roof according to claim 2, wherein said density of said coverboard is greater than about 3.5 pounds per cubic foot.

4. A covered low-slope or flat roof according to claim 1 wherein said coverboard includes a thickness greater than about 0.5 inches.

5. A covered low-slope or flat roof according to claim 4, wherein said coverboard thickness is from about 0.5 to about 4.5 inches.

6. A covered low-slope or flat roof according to claim 5, wherein said coverboard thickness is from about 1.0 to about 4.0 inches.

7. A covered low-slope or flat roof according to claim 1, wherein said glass facer is formed from a material selected from a group of materials including coated glass fiber mats, uncoated glass fiber mats, and chopped glass.

8. A composite board according to claim 1 where the polymeric membrane is selected from the group consisting of poly(ethylene-co-propylene-co-diene)terpolymer rubber, poly(ethylene-co-propylene) copolymer rubber, thermoplastic olefin, thermoplastic vulcanizate, and polyvinyl chloride membranes.

9. A composite board according to claim 1 where the insulation board includes polyisocyanurate and where the cover board includes polyisocyanurate.

10. A covered low-slope or flat roof according to claim 1, wherein said density of said coverboard is between about 4 and 5 pounds per cubic foot.

11. A covered low-slope or flat roof according to claim 10, wherein said density of said insulation board is less than 2.2 pounds per cubic foot.

12. A covered low-slope or flat roof according to claim 1, wherein said density of said insulation board is less than 2.2 pounds per cubic foot.

13. A method of re-roofing an existing low-slope or flat roof, the method comprising:
   (a) applying a re-coverboard to said roof, wherein the re-coverboard includes a polyurethane, a polyisocyanurate, or a mix of polyurethane and polyisocyanurate cellular structure, said re-coverboard having a density that is greater than about 2.5 pounds per cubic foot and less than 6 pounds per cubic foot, an iso index of at least 175, and a first planar surface and a second planar surface, said first planar surface and said second planar surface having a facer positioned adjacent thereto; and
   (b) applying a re-insulation board to said roof, said re-insulation board including a polyurethane, a polyisocyanurate, or a mix of polyurethane and polyisocyanurate cellular structure, said re-insulation board having a density that is less than 2.5 pounds per cubic foot; and
   (c) applying a polymeric membrane to said roof subsequent to the steps of applying a re-coverboard and applying a re-insulation board.

14. A method of re-roofing according to claim 13, wherein said density of said re-coverboard is between about 4 and 5 pounds per cubic foot.

15. A method of re-roofing according to claim 14, wherein said density of said re-insulation board is less than 2.2 pounds per cubic foot.

16. A method of re-roofing according to claim 13, wherein said density of said re-insulation board is less than 2.2 pounds per cubic foot.

17. A composite board comprising a planar structure including:
   (a) a first layer comprising a polyurethane, a polyisocyanurate, or a mix of polyurethane and polyisocyanurate cellular structure, said first layer having a density that is less than about 2.5 pounds per cubic foot, and
   (b) a second layer comprising a polyurethane, a polyisocyanurate, or a mix of polyurethane and polyisocyanurate cellular structure, said second layer having a density that is greater than about 2.5 pounds per cubic foot and less than 6 pounds per cubic foot and an iso index of at least 175,
   (c) at least one facer applied to said first layer or said second layer.

18. The composite board of claim 17, wherein said board is manufactured by forming said first layer adjacent to said second layer.

19. The composite board of claim 17, wherein said at least one facer is formed from a material selected from a group of materials including aluminum foil, cellulosic fibers, reinforced cellulosic fibers, craft paper, coated glass fiber mats, uncoated glass fiber mats, chopped glass, fiber board perlite board, and gypsum board.

20. A composite board according to claim 17 wherein said second layer includes a thickness of from about 0.5 inches to about 2.0 inches.

21. A composite board according to claim 20 wherein said second layer includes a thickness of from about 0.5 inches to about 1.0 inches.

22. A composite board according to claim 21 wherein said second layer includes a thickness of from about 0.5 inches to about 0.75 inches.

23. A composite board according to claim 17, wherein said density of said second layer is between about 4 and 5 pounds per cubic foot.

24. A composite board according to claim 23, wherein said density of said first layer is less than 2.2 pounds per cubic foot.

25. A composite board according to claim 17, wherein said density of said first layer is less than 2.2 pounds per cubic foot.

26. A composite board comprising:
   at least one low density layer comprising a polyurethane, a polyisocyanurate, or a mix of polyurethane and polyisocyanurate cellular structure, said low density layer having a density that is less than about 2.5 pounds per cubic foot, and
   at least one high density layer comprising a polyurethane, a polyisocyanurate, or a mix of polyurethane and polyisocyanurate cellular structure, said high density layer having a density that is greater than about 2.5 pounds per cubic foot and less than 6 pounds per cubic foot and an iso index of at least 175,
   at least one facer applied to said low density layer or said high density layer.

27. A composite board according to claim 26, wherein said composite board includes four alternating layers, said four alternating layers including two high density layers and two low density layers.

28. A composite board according to claim 27, wherein facers are positioned between said four alternating layers.

29. A composite board according to claim 26, wherein said composite board includes three layers, said three layers including a high density layer sandwiched between two low density layers.

30. A composite board according to claim 26, wherein said composite board includes three layers, said three layers including a low density layer sandwiched between two high density layers.

31. A composite board according to claim 26 wherein said high density layer includes a thickness of from about 0.5 inches to about 2.0 inches.

32. A composite board according to claim 31 wherein said high density layer includes a thickness of from about 0.5 inches to about 1.0 inches.

33. A composite board according to claim 32 wherein said high density layer includes a thickness of from about 0.5 inches to about 0.75 inches.

34. A composite board according to claim 26, wherein said density of said high density layer is between about 4 and 5 pounds per cubic foot.

35. A composite board according to claim 23, wherein said density of said low density layer is less than 2.2 pounds per cubic foot.

36. A composite board according to claim 26, wherein said density of said low density layer is less than 2.2 pounds per cubic foot.

* * * * *